United States Patent
Bailiang

(10) Patent No.: US 9,134,886 B2
(45) Date of Patent: Sep. 15, 2015

(54) PROVIDING INDOOR FACILITY INFORMATION ON A DIGITAL MAP

(71) Applicant: Zhou Bailiang, Balgowlah (AU)

(72) Inventor: Zhou Bailiang, Balgowlah (AU)

(73) Assignee: GOOGLE INC., Mountain View, CA (US)

( * ) Notice: Subject to any disclaimer, the term of this patent is extended or adjusted under 35 U.S.C. 154(b) by 87 days.

(21) Appl. No.: 13/761,539

(22) Filed: Feb. 7, 2013

(65) Prior Publication Data

US 2014/0223360 A1   Aug. 7, 2014

(51) Int. Cl.
| | |
|---|---|
| *G06F 3/0481* | (2013.01) |
| *G06F 3/0484* | (2013.01) |
| *G06F 9/44* | (2006.01) |
| *G01C 21/32* | (2006.01) |
| *G01C 21/36* | (2006.01) |
| *G09B 29/10* | (2006.01) |

(52) U.S. Cl.
CPC ............. *G06F 3/0484* (2013.01); *G01C 21/32* (2013.01); *G01C 21/367* (2013.01); *G01C 21/3682* (2013.01); *G06F 3/0481* (2013.01); *G06F 9/4443* (2013.01); *G06F 9/4446* (2013.01); *G09B 29/106* (2013.01)

(58) Field of Classification Search
CPC combination set(s) only.
See application file for complete search history.

(56) References Cited

U.S. PATENT DOCUMENTS

| | | | |
|---|---|---|---|
| 6,397,143 B1 * | 5/2002 | Peschke ................. | 701/432 |
| 6,697,734 B1 * | 2/2004 | Suomela ................. | 701/455 |
| 7,890,257 B2 * | 2/2011 | Fyke et al. ............. | 701/431 |
| 7,954,070 B2 * | 5/2011 | Plocher et al. ........ | 715/854 |
| 8,126,748 B2 * | 2/2012 | Sunshine et al. ...... | 705/5 |
| 8,243,102 B1 | 8/2012 | Cornell | |
| 8,434,029 B2 * | 4/2013 | Albright ................ | 715/865 |
| 8,464,181 B1 * | 6/2013 | Bailiang et al. ...... | 715/848 |
| 2002/0010522 A1 * | 1/2002 | Martin .................. | 700/97 |
| 2004/0103431 A1 * | 5/2004 | Davenport et al. ... | 725/33 |
| 2007/0210937 A1 | 9/2007 | Smith et al. | |
| 2008/0222548 A1 * | 9/2008 | Cohen et al. .......... | 715/770 |
| 2009/0198767 A1 * | 8/2009 | Jakobson et al. ..... | 709/203 |
| 2010/0146436 A1 * | 6/2010 | Jakobson et al. ..... | 715/800 |
| 2012/0123819 A1 | 5/2012 | Fehnel et al. | |
| 2013/0226451 A1 * | 8/2013 | O'Neill et al. ........ | 701/450 |
| 2014/0018096 A1 * | 1/2014 | Jagannath ............. | 455/456.1 |

OTHER PUBLICATIONS

"The National Public Toilet Map," (2013). Retrieved from the Internet on Nov. 7, 2013: URL:https://toiletmap.gov.au/engadet, "Google Maps Indoor Navigation: Yea, It Works at CES," (2012). Retrieved from the Internet on Nov. 7, 2013: URL:http://www.engadget.com/2012/01/08/google-maps-indoor-navigation-las-vegas-ces-2012/.

(Continued)

*Primary Examiner* — Phenuel Salomon
(74) *Attorney, Agent, or Firm* — Marshall, Gerstein & Borun LLP

(57) ABSTRACT

A digital map of a geographic area, along with a representation of a building located in the geographic area, is displayed at a selected zoom level via a user interface of a computing device. Availability of indoor facilities at the building is determined. When the selected zoom level has a first value, the one or more indicators of indoor facilities available at the building are displayed inside the representation of the building at respective locations of these indoor facilities. However, when the selected zoom level has a second value, the one or more indicators of indoor facilities available at the building are displayed over or proximately to the representation of the building at a location unrelated to the respective locations of the indoor facilities.

20 Claims, 5 Drawing Sheets

(56) References Cited

OTHER PUBLICATIONS

Map Share Reporter Suggestions for Improvement, TomTom Discussions. (2012) Retrieved from the Internet on Nov. 6, 2012: URL:http://discussions.tomtom.com/t5/Map-quality/Map-Share-Reporter-suggestions-for-improvement/td-p/151761/page/23.
International Search Report and Written Opinion for Application No. PCT/US2014/014551, dated May 20, 2014.

* cited by examiner

PROVIDING INDOOR FACILITY INFORMATION ON A DIGITAL MAP

FIELD OF THE DISCLOSURE

The present disclosure relates to digital maps and, more particularly, to providing indoor facility information for representations of structures displayed as part of digital maps on a computing device.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Today, a wide variety of computing devices, including many portable devices, support software applications that display digital maps ("mapping applications"). For example, mapping applications may run on laptop and tablet computers, mobile phones, car navigation systems, hand-held global positioning system (GPS) units, etc.

In general, a mapping application can display various types of geographic data including topographical data, street data, urban transit information, and traffic data. Further, the geographic data may be schematic or based on photography, such as satellite imagery. Still further, a mapping application can display the information in a two-dimensional (2D) or three-dimensional (3D) format.

A user sometimes may operate a mapping application to view a map of an urban area, which may include structures such as buildings, parks, train stations, etc. For such structures, various indoor facility information, such as public restrooms, elevators, lockers, etc., may be available. However, when viewing the map at a zoom level in which the internal layout of the structures is not visible, it is difficult for the mapping application to display the indoor facility information without creating confusion and clutter.

SUMMARY

In one implementation, a method for providing indoor facility information on a digital map is implemented in computing device. The method includes displaying a digital map of a geographic area via a user interface of the computing device at a selected zoom level, including displaying a representation of a structure located in the geographic area. The method further includes determining availability of indoor facilities at the structure, and displaying one or more indicators of indoor facilities available at the structure. In particular, displaying the one or more indicators of indoor facilities includes: (i) when the selected zoom level has a first value, displaying the one or more indicators inside the representation of the structure at respective locations of the indoor facilities, and (ii) when the selected zoom level has a second value, displaying the one or more indicators over or proximately to the representation of the structure at a location unrelated to the respective locations of the indoor facilities.

In another implementation, a tangible computer-readable medium stores instructions. When executed on one or more processors of a computing device, the instructions cause the one or more processors to (i) display a digital map of a geographic area via a user interface of the computing device at a selected zoom level, where the digital map includes a representation of a structure, (ii) receive indoor facility information for several indoor facilities available at the structure, where the indoor facility data specifies, for each of the indoor facilities, (i) an indoor facility type, and (ii) a location of the indoor facility within the structure, and (iii) display respective indicators for the several indoor facilities. To display the indicators, the instructions cause the one or more processors to (i) display the indicators inside the representation of the structure at respective locations of the indoor facilities when the selected zoom level has a high value and (ii) display all the indicators at a common point on the digital map at or near the representation of the structure when the selected zoom level has a low value.

In yet another implementation, a computing device includes one or more processors, a user interface configured to receive user input and display output, and a computer-readable medium storing instructions. When executed on the one or more processors, the instructions cause the computing device to receive, via the user interface, a request to display a digital map of a geographic area at a specified zoom level, display the digital map via the user interface at the specified zoom level, where the digital map includes a representation of a structure located in the geographic area, and, when the specified zoom level is high, display respective indicators for several indoor facilities available at the structure at corresponding locations within the representation of the structure. However, when the selected zoom level is low, the instructions cause the computing device display all the indicators at a common point on the digital map at or near the representation of the structure.

DETAILED DESCRIPTION

A mapping software module operating on a computing device displays a digital map of a geographic region in which a structure (e.g., a building, a park, a train station, etc.) is located. If indoor facility information, such as presence and location of public restrooms, elevators, lockers, etc. is available for the structure, the mapping software module displays the indoor facility information on the digital map in a manner dependent on the zoom level.

In one example implementation, the mapping software module displays a 2D schematic map that includes a structure and available indoor facility information for the structure. A user selects the desired zoom level to view the map, where higher zoom levels correspond to greater magnification. If the user selects a low zoom level at which the internal layout of the structure is not visible, the mapping software module displays the indoor facility information next to the footprint of the structure. The mapping software module can provide the indoor facility information as one or several icons, a text label, a pop-up informational window, etc. Further, when information about one or more entrances to the structure is available, the mapping software module can display the indoor facility information next to an entrance to provide additional guidance to the user. The mapping software module can display the indoor facility information in the same manner at multiple low zoom levels. However, if the user zooms in on the structure and selects a map view that shows the internal layout of the structure, the mapping software module can place the indoor facility information at the respective indoor locations within the structure and optionally remove the indoor facility information displayed next the footprint of the structure.

These techniques are discussed in more detail below with reference to FIGS. 1-5. In particular, embodiments of an example system in which a mapping software module may present indoor facility information for structures are described with reference to FIG. 1, example screenshots of the mapping software module are discussed with reference to FIGS. 2 and 3, and example methods which the mapping software module and/or a map server may implement to provide indoor facility information for structures are discussed with reference to FIGS. 4 and 5, respectively.

Figure 1:
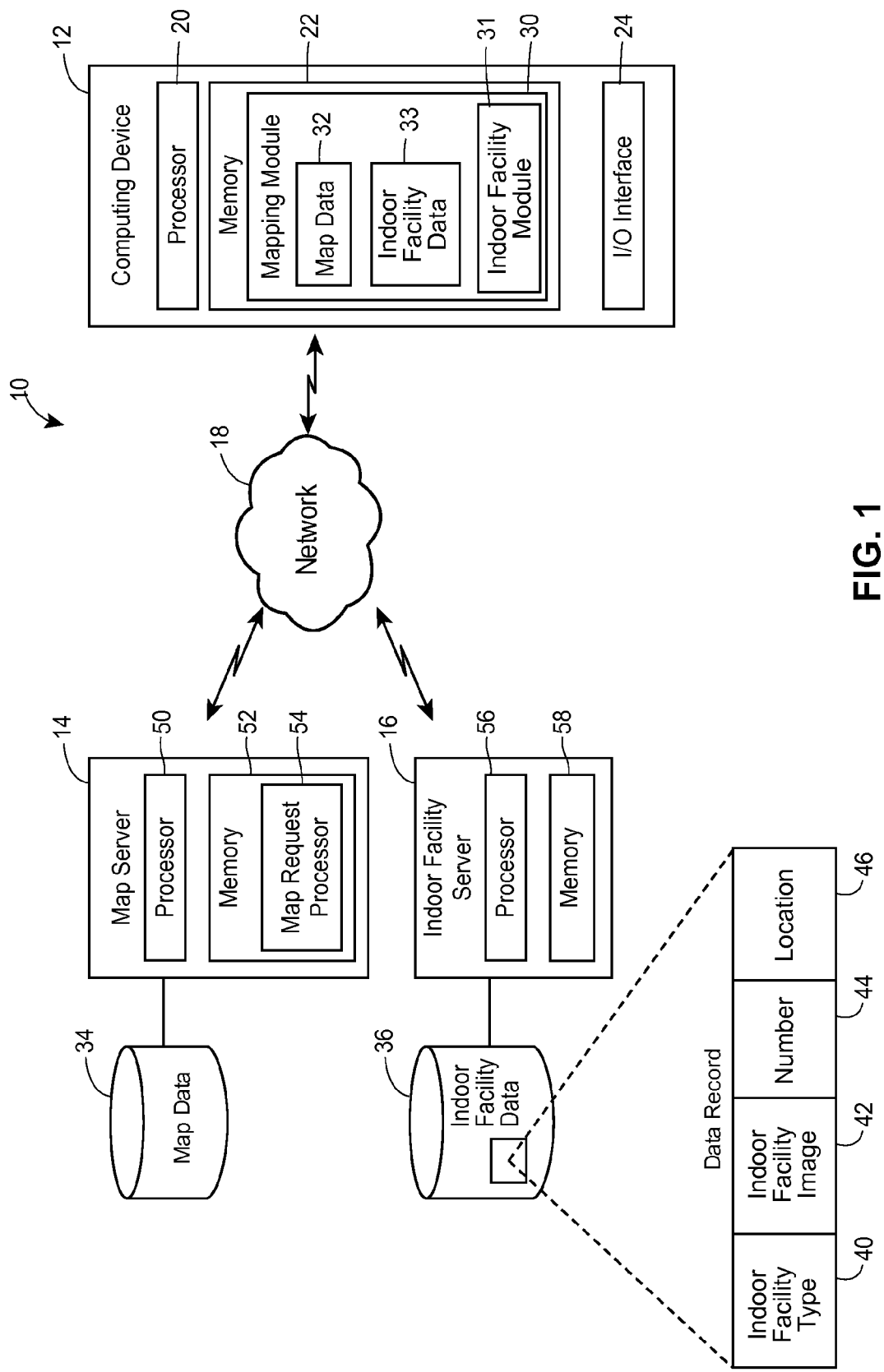
FIG. 1 is a block diagram of an example system in which techniques for presenting indoor facility information in a mapping application are implemented.

Referring first to FIG. 1, a system 10 includes a computing device 12 coupled to a map server 14 and an indoor facility server 16 via a communication network 18. The computing device 12 can be, for example, a laptop computer, a tablet computer, a smartphone, a navigation device mounted in a vehicle, etc. The network 18 in general can include wired and/or wireless communication links and may include, for example, a wide area network (WAN) such as the Internet, a local area network (LAN), a cellular telephone network, or any other suitable type of a network.

In the embodiment shown in FIG. 1, the computing device 12 includes a processor 20, a computer-readable memory 22, and an input/output (I/O) interface 24. In various implementations, the I/O interface 24 can include a touchpad over which the user moves his fingers while looking at a separately provided screen, a touchscreen where the user places his fingers directly over the image being manipulated or over a displayed control being activated (e.g. a displayed keyboard), a keyboard, a mouse, etc. The processor 20 may include a central processing unit (CPU), for example. More generally, the computing device 12 can include one or more processors and, if desired, one or more graphics processing units (GPUs) as well as other processing units. The memory 22 is a computer-readable non-transitory storage device that may include both persistent (e.g., a hard disk, a flash drive) and non-persistent (e.g., RAM) memory components. The memory 22 stores instructions executable on the processor 20 that make up a mapping software module 30 including an indoor facility module 31. The memory 22 also stores map data 32 and indoor facility data 33 on which the mapping module 30 operates. In various implementations, the computing device 12 can include additional components, such as one or more wired and/or wireless network interfaces, peripheral devices such as a mouse, etc.

In operation, the mapping module 30 generates requests for map data in accordance with how the user positions the viewport using pan, zoom, and other controls. A request for map data can specify, for example, the geographic area for which the computing device 12 will display a digital map, the zoom level, the desired layers of additional information of (e.g., traffic, weather, satellite imagery, etc.). The computing device 12 transmits the requests to the map server 14. In response, the map server 14 retrieves map data from a map database 34 and provides the map data to the computing device 12 via the network 18 (in the form of one or a series of messages). The computing device 12 then stores the received map data in the memory 22 as the map data 32.

In some implementations, the map server 14 also communicates with the indoor facility server 16 to retrieve corresponding indoor facility data from an indoor facility database 36. The map server 14 then provides enhanced map data to the computing device 12, which can be made up of the map data, the indoor facility data, and appropriate indications of how the map data and the indoor facility data are to be displayed for the specified geographic area and zoom level. Once the mapping module 30 receives the map data 32 and the indoor facility data 33 for the specified geographic area, the indoor facility module 31 can determine how the map data 32 and the indoor facility data 33 are to be displayed for the currently selected zoom level. The mapping module 30 then renders digital map for the specified geographic area and zoom level, and causes the digital map to be displayed via the I/O interface 24. In other implementations, the indoor facility module 31 or another component operating in the client computing device 12 requests and receives indoor facility data directly from the indoor facility server 16.

The mapping software module 30 according to various implementations operates as a separately executable software application, a plugin that extends the functionality of another software application such as a web browser, an application programming interface (API) that may be invoked by a software application, etc. The instructions that make up the mapping module 30 may be compiled and executable on the processor 20 directly, or not compiled and interpreted by the processor 20 at runtime.

Depending on the implementation, the map data 32 may be in a raster format, such as Portable Network Graphics (PNG), a vector graphics format (based on mathematical descriptions of geometric shapes), or any other suitable format. The map data 32 in some cases is divided into map tiles, or portions of a digital map having a certain fixed size, such as 256 by 256 pixels. The mapping software module 30 renders or assembles a digital map based on the map data and causes the digital map to be displayed via the I/O interface 24. When the map data 32 is already rasterized, the mapping module 30 generates the digital map by selecting and combining the proper rasterized tiles. However, if the map data 32 is in a vector graphics format, the mapping module 30 first interprets the descriptions of various shapes and applies specified textures to the shapes to generate the corresponding raster images. The mapping software module 30 also adjusts the displayed digital map and requests new map data, when necessary, in response to user input received via the I/O interface 24. More specifically, the user may change the zoom level, pan across the map, and otherwise interact with the map.

When provided in a vector graphics format, map data may specify individual map elements representing such physical entities as structures (e.g., buildings, parks, train stations, etc.), roads, bodies of water, and other natural and artificial objects visible outside (e.g., from above or at a street level). Map data also can include text-based label data as well as metadata that includes additional information about the physical entity. In a raster format, map elements typically are embedded into the same image of a digital map. Map data may also include text-based label data for displaying various labels such as street names or names of landmarks. In general, map data may be used to generate 2D images or 3D images, and may include schematic data, photographic images, or both.

The indoor facility data 33 may specify indoor facility information for map elements such as buildings or other structures. For example, indoor facility information for a building may include the number and locations of public restrooms, elevators, escalators, wheelchair ramps, drinking fountains, lockers, etc. For multi-level structures such as multi-story buildings, indoor facility data may specify indoor facility information on a per-floor basis. Similar to map data, indoor facility data may include both graphics content and non-graphics (e.g., text) content, and the graphics content in turn may include schematic illustrations, photographic images, interactive and non-interactive icons, etc. In the implementation illustrated in FIG. 1, the indoor facility data is in the form of a data record that includes an indoor facility type field 40, an indoor facility image field 42, a number field 44 and a location field 46.

As one example, the indoor facility type field 40 of a certain data record may specify that the type of the indoor facility is "elevator bank," the indoor facility image field 42 may include or reference an elevator icon, the number field 44 may specify the total number of elevators in the elevator bank, and the location field 46 may specify the local or global coordinates (or other indication of position) of the elevator bank within the building.

In other implementations, the data records of the indoor facility data 36 can include fewer fields or, conversely, may include additional fields. For example, the indoor facility module 31 in one implementation stores icons for each indoor facility type, and the indoor facility data 36 need not include the field 42. Further, some of the data records may not have information in each of the fields 40-46. For example, a data record in the indoor facility data 36 may specify the location of an elevator bank but not the number of elevators in the elevator bank.

The mapping software module 30 displays indoor facility information for a structure on a digital map according to a user-selected zoom level. As indicated above, the indoor facility information can include icons, text labels, etc. If a user selects a relatively low zoom level at which the internal layout of the structure is not visible, the indoor facility information for a structure is grouped together and displayed next to the footprint (or outline) of the structure. When information about one or more entrances to the structure is available, the mapping software module 30 may group and display the indoor facility information next to an entrance (e.g., the primary entrance to the structure). Alternatively, the mapping software module 30 may identify a relatively empty portion of the map adjacent or proximate to the representation of the structure (e.g., a wide street running past the structure) and display the indoor facility information in the identified portion of the map. In this manner, the mapping software module 30 can reduce occlusion of map information by indoor facility icons, labels, etc. As yet another alternative, the mapping software module 30 can display may display indoor facility information next to the text label generated of the structure, such as "community center." For example, a set of icons can be displayed immediately after or directly below the text label.

If the user selects a high zoom level at which the internal layout of the structure is visible, the indoor facility information is placed separately and displayed at the respective indoor locations within the structure.

In some implementations, the mapping software module 30 displays indoor facility information at a low zoom level only after the user "hovers" over the representation of the structure (e.g., by placing the mouse cursor over the representation of the structure for a certain amount of time or lightly touching the representation of the structure on a touchscreen). As one example, the mapping software module 30 can display the indoor facility information at low zoom levels in the form of a tooltip-style popup window. Placement of indoor facility information in the form of icons is discussed further with reference to FIGS. 2 and 3.

With continued reference to FIG. 1, the map server 14 may include a processor 50 and a memory 52 that stores a map request processor 54, made up of instructions executable on the processor 50. Similarly, the indoor facility server 16 may include a processor 56 and a memory 58 storing instructions executable on the processor 56.

For simplicity, FIG. 1 illustrates both the map server 14 and the indoor facility server 16 as only one instances of a server device. However, according to some implementations, the map server 14 and/or the indoor facility server 16 may include a group of one or more server devices, each equipped with one or more processors and capable of operating independently of the other server devices. For example, map server devices operating in such a group can process requests from the computing device 12 individually (e.g., based on availability), in a distributed manner where one operation associated with processing a request is performed on one map server device while another operation associated with processing the same request is performed on another map server device, or according to any other suitable technique. Further, the map server 14 and the indoor facility server 16 may be owned by a single business entity and located in a single geographic location (e.g., a server farm). Alternatively, the map server 14 and/or the indoor facility server 16 may be owned by different business entities and located across a number of geographic locations. For the purposes of this discussion, the term "map server" may refer to an individual map server device or to a group of two or more map server devices. Similarly, the term "indoor facility server" may refer to an individual indoor facility server device or to a group of two or more indoor facility server devices.

Figure 2:
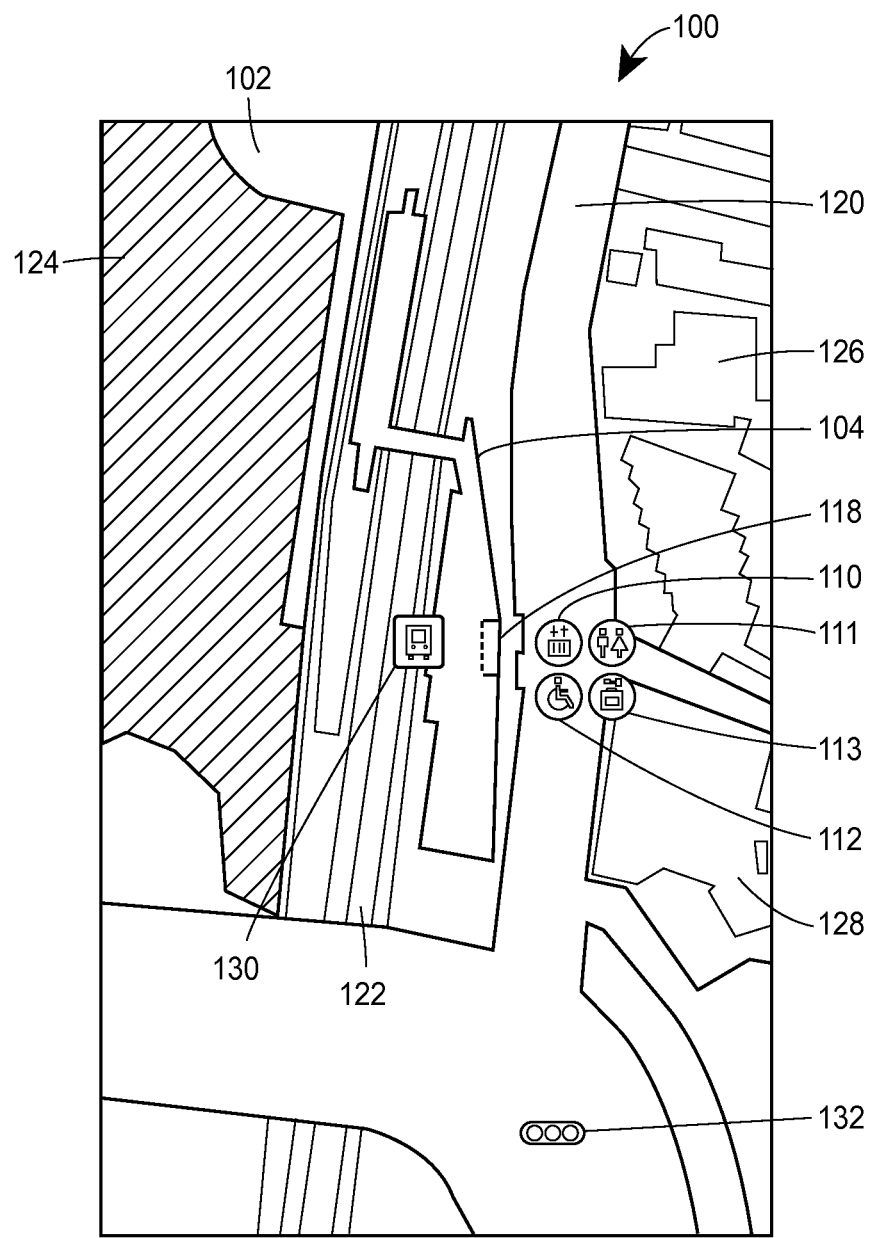
FIG. 2 is an example screenshot which a mapping application can generate to display indoor facility information at a low zoom level range.
Figure 3:
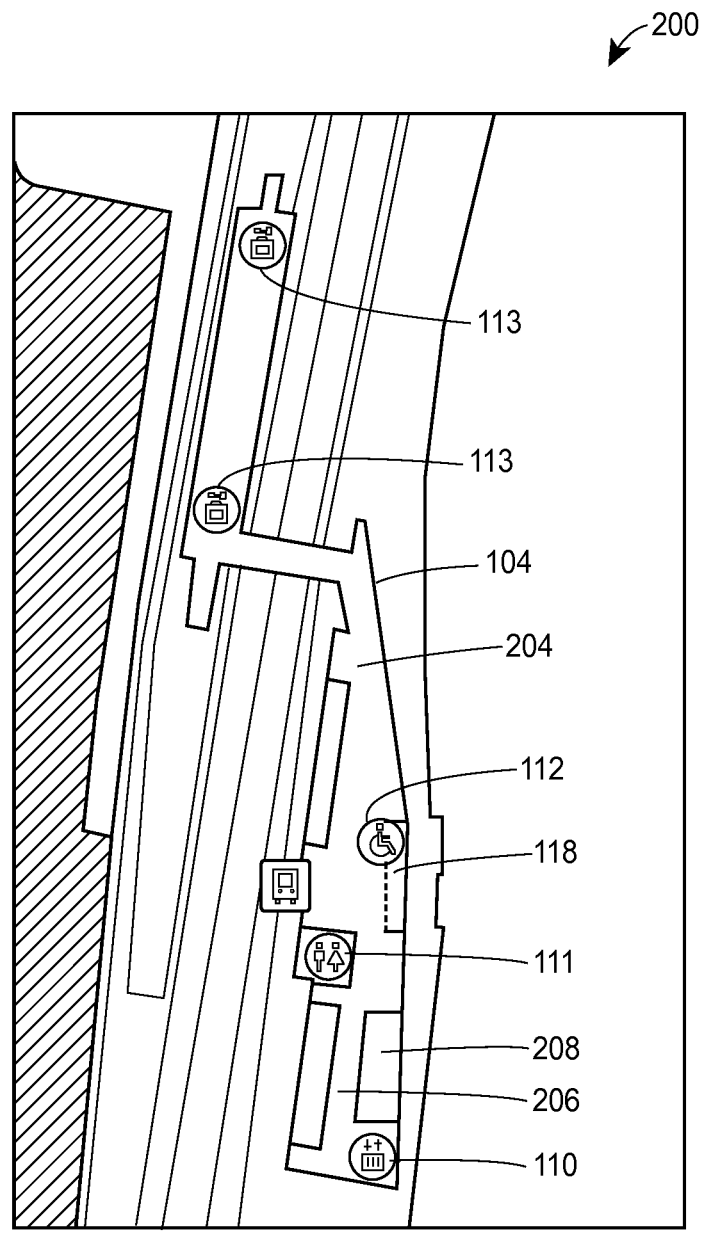
FIG. 3 is an example screenshot which a mapping application can generate to display indoor facility information for a high zoom level range.

Referring to FIGS. 2 and 3, the mapping module 30 can generate screenshots 100 and 200 according to an example scenario. The screenshot 100 illustrates a representation of a train station 104 overlaying a digital map of a geographic area 102. Various icons representing the indoor facility information for the train station 104 are displayed within a same viewport. However, when a user zooms in on the train station 104, an internal layout of the train station becomes visible as illustrated in an example screenshot 200 in FIG. 3.

In FIG. 2, the digital map 102 shows a footprint of the train station 104, which provides a general indication of the shape of the train station. The mapping module 30 displays the indoor facility information available for the train station 104 as icons such as an elevator icon 110 representing elevators, a restroom icon 111 representing public restrooms, a wheelchair icon 112 representing wheelchair ramps, and a key and baggage icon 113 representing lockers. The screenshot 100 corresponds to a scenario in which a user selected a low zoom level range, and the mapping module 30 in response presented the icons 110-113 as a group next to the train station 104. By grouping icons together, the mapping module 30 reduces clutter on the screen.

Further, when information about one or more entrances to a structure is available, the mapping module 30 presents the available indoor facility information next to an entrance in order to provide additional guidance to the user. In the example of FIG. 2, the mapping module 30 generates the map 102 that illustrates an entrance 118 to the train station 104, with the icons 110-113 being grouped and displayed next to the entrance 118. The map 102 also illustrates other map elements such as roads 120, railroad tracks 122, parks 124, and footprints of buildings 126 and 128. Various icons and text labels can be linked to these map elements, such as a train icon 130 indicating the train station 104 and a traffic light icon 132 indicating traffic lights on the roads 120, for example. Although the map 102 is a 2D map on which most map elements are illustrated with a one-point projection, the train station 104 in general can overlay other suitable types of map such as a 3D map, for example.

In the example of FIG. 2, the footprints 104, 126 and 128 are illustrated with a low-level of detail that do not include the shape of every external wall or ornamental features of the buildings. In another implementation, however, these footprints may be illustrated with a two-point perspective, or as 3D shapes displayed according to an isometric projection. More generally, and as discussed above, structures on a map may be illustrated using any suitable 2D or 3D shapes rendered with any desired level of detail.

Once the user decides to zoom in on the train station 104, the mapping module 30 generates an internal layout map 204 for the train station 104 as part of a larger digital map, as illustrated in FIG. 3. More particularly, the screenshot 200 corresponds to a scenario in which the user selected a high zoom level range, and the mapping module 30 in response presented the icons 110-113 at the respective indoor locations within the train station 104. In some implementations, in addition to the types and locations of available indoor facilities (as represented by the icons 110-113), the mapping module 30 also depicts the numbers for the corresponding facilities. Further, the mapping module 30 can include in the internal layout map 204 hallways 206, rooms or offices 208, etc., although in general the internal layout map 204 can depict any available internal layout features.

Figure 4:
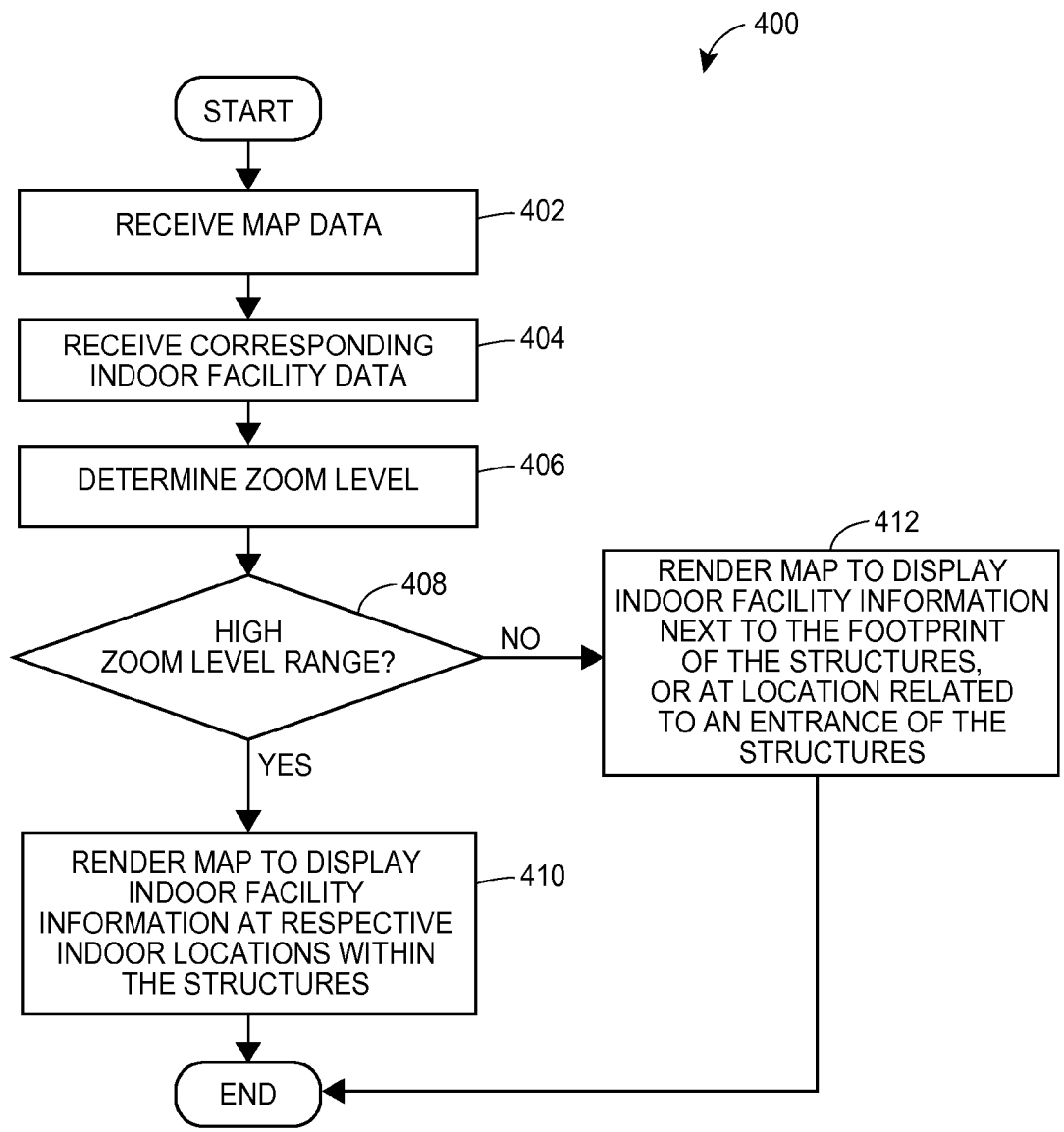
FIG. 4 is a flow diagram of an example method for providing indoor facility information in a mapping application, which the client computing device of FIG. 1 can implement.
Figure 5:
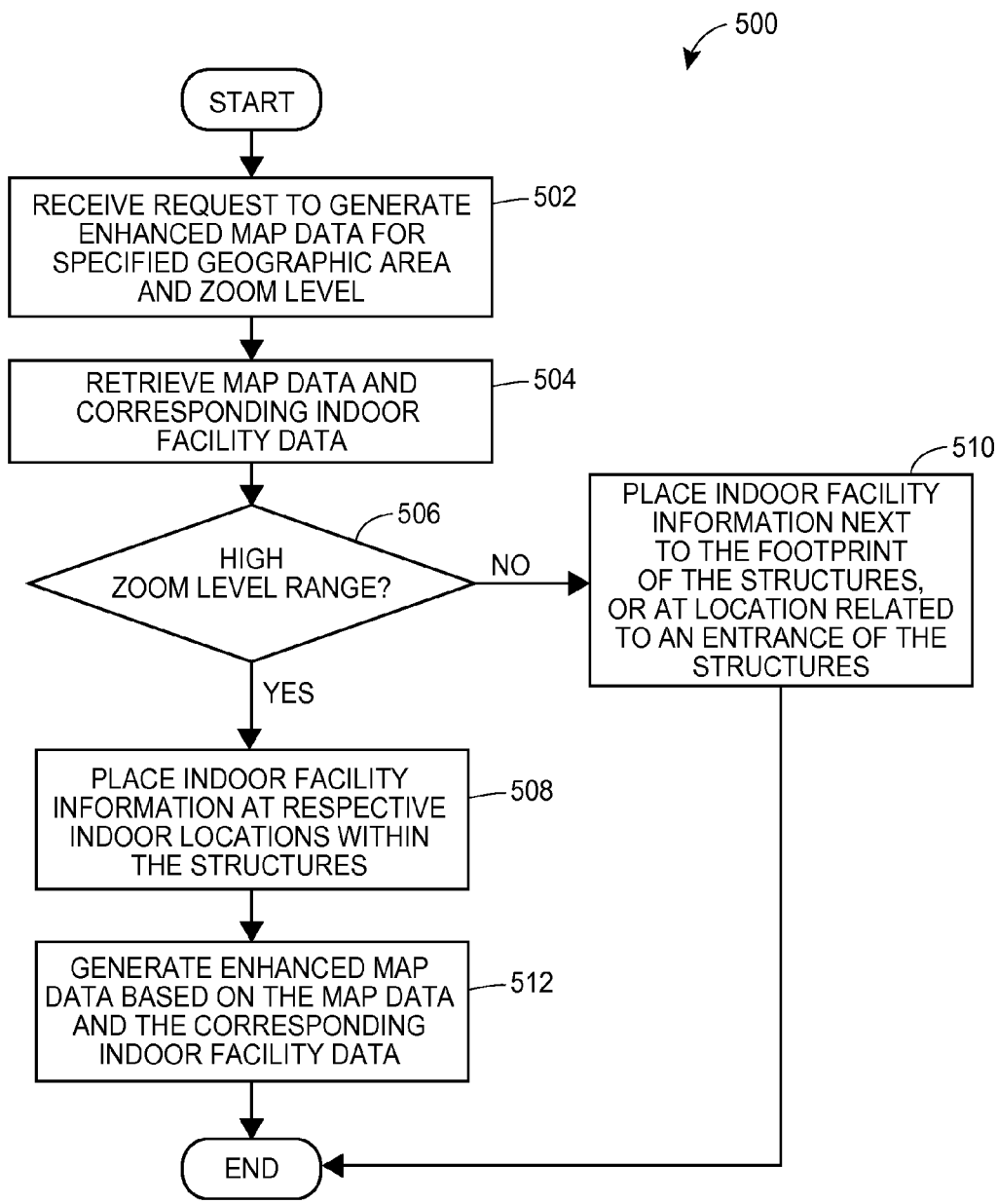
FIG. 5 is a flow diagram of an example method for providing indoor facility information in a mapping application, which the map server of FIG. 1 can implement.

To further illustrate the techniques for providing indoor facility information for structures, example methods which a mapping software module on a computing device operating on a client side and a map server operating on a server side may implement are discussed next with reference to FIGS. 4 and 5, respectively. In an example implementation, the method of FIG. 4 is implemented in mapping module 30 executing on the computing device 12, and the method of FIG. 5 is implemented in the map request processor 54 executing on the map server 14. More generally, however, these methods can be implemented in any suitable software application or module (e.g., a browser plugin). Each of these methods can be implemented as sets of instructions stored on a computer-readable medium and executable on one or more processors.

The flow diagram of FIG. 4 illustrates an example method 400 for providing indoor facility information for structures on a map of a geographic area and zoom level on the client side. At block 402, map data for a specified geographic area is received. The map data may be received on the client side (e.g., a client computing device) in response to sending a request to a map server for map data, for example. The received map data may include map elements such as buildings for which indoor facility information is available. At block 404, indoor facility data corresponding to the received map data is received. Depending on the implementation, the indoor facility can be received automatically (i.e., without a specific request) along with the map data or in response to a request transmitted to an indoor facility server. The indoor facility data specifies available indoor facility information for the structures.

Next, at block 406, the zoom level at which the map data is to be rendered is determined. In general, the zoom level is set according to a user command. As discussed above, the zoom level may be in a low zoom level range in which the internal layout of the structures is not visible, or the zoom level may be in a high zoom level range in which the internal layout of the structures is visible. At block 408, the method 400 determines whether the high zoom level range is selected. If the high zoom level range is selected, the method 400 proceeds to block 410, where a digital map is rendered to display the indoor facility information for the structures at the respective indoor locations within the structures. If the high zoom level range is not selected, the method 400 proceeds to block 412.

At block 412, a map is rendered on the client side to display the indoor facility information for the structures next to the footprint of the structures. In one implementation, the indoor facility information is grouped together to provide clarity and reduce clutter on the display screen. Additionally, if information about one or more entrances to a structure is available, the indoor facility information is grouped together and displayed at a location corresponding to (or, at least, related to) an entrance to the structure. It is noted that in this case, the location at which the indoor facility information is displayed is unrelated to the locations of the corresponding indoor facilities.

The flow diagram of FIG. 5 illustrates an example method 500 for providing indoor facility information for structures on a map of a geographic area and zoom level. At block 502, a request is received to generate enhanced map data for a specified geographic area and a specified zoom level, i.e., map data augmented by indoor facility information or data. The map data for the specified geographic area along with the corresponding indoor facility information are retrieved at block 504. The map data may include map elements such as structures, and the corresponding indoor facility data may specify available indoor facility information for the structures.

At block 506, it is determined whether the specified zoom level falls within the high zoom level range. If so, the method 500 proceeds to block 508, where the indoor facility information (in the form of icons, labels, images, etc.) is placed at the respective indoor locations within the structures. Otherwise, the flow proceeds to block 510, where the indoor facility information for the structures is grouped together and placed next to the footprint of the structures. Depending on the implementation, the enhanced map data is generated as raster (i.e., pixel-based) images or vector data. Additionally, if information about one or more entrances to the structures is available, the indoor facility information is grouped together and displayed at a location related to an entrance of the structures. Next at block 512, the enhanced map data is generated to be transmitted to a client, such as the computing device 12, for example.

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components or modules. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

A hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or a server farm), while in other embodiments the processors may be distributed across a number of locations.

The one or more processors may also operate to support performance of the relevant operations in a "cloud computing" environment or as an SaaS. For example, at least some of the operations may be performed by a group of computers (as examples of machines including processors), these operations being accessible via a network (e.g., the Internet) and via one or more appropriate interfaces (e.g., application program interfaces (APIs)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Upon reading this disclosure, those of skill in the art will appreciate still additional alternative structural and functional designs for providing indoor facility information for structures on a digital map through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method in a computing device for providing indoor facility information on a digital map, the method comprising:
   displaying a first digital map of a geographic area via a user interface of the computing device at a first zoom level, including displaying a first representation of a structure located in the geographic area;
   displaying a second digital map of the geographic area via the user interface at a second zoom level, including displaying a second representation of the structure;
   determining, by one or more processors, availability of indoor facilities at the structure; and
   displaying one or more indicators of indoor facilities available at the structure, including:
      at the first zoom level, (i) determining, by the one or more processors, physical locations of the indoor facilities within the structure and (ii) displaying the one or more indicators on the first digital map, at places corresponding to the determined physical locations, and
      at the second zoom level, displaying the one or more indicators on the second digital map, over or proximately to the representation of the structure, at a place corresponding to a physical location unrelated to the respective physical locations of the indoor facilities within the structure,
      wherein the one or more indicators have a same appearance on the first digital map and on the second digital map.

2. The method of claim 1, wherein displaying the one or more indicators over or proximately to the representation of the structure includes displaying the one or more indicators near an entrance to the structure.

3. The method of claim 2, wherein displaying the one or more indicators near an entrance to the structure includes:
   grouping together a plurality of indicators of indoor facilities available at different respective physical locations with the structure, and
   displaying the grouped plurality of indicators near the entrance of the structure.

4. The method of claim 1, wherein displaying the one or more indicators includes displaying, for each indoor facility, an icon representative of a type of the indoor facility.

5. The method of claim 4, wherein each indoor facility is one of (i) a public restroom, (ii) an elevator, (iii) a drinking fountain, or a (iv) a locker.

6. The method of claim 1, wherein displaying the one or more indicators includes displaying, for each indoor facility, a corresponding text label.

7. The method of claim 1, wherein displaying the one or more indicators at the second zoom level is in response to a user hovering over the representation of the structure.

8. The method of claim 7, wherein displaying the one or more indicators at the second zoom level includes generating a tooltip-style popup window.

9. The method of claim 1, wherein:
   the second zoom level corresponds to a low zoom level at which an internal layout of the structure is not visible, and
   the first zoom level corresponds to a high zoom level at which the internal layout of the structure is visible.

10. The method of claim 1, further comprising:
    receiving, from a map server, a data record describing one of the indoor facilities, the data including (i) an indication of a type of the indoor facility, (ii) an indication of an image corresponding to the indoor facility, and (iii) an indication of a location of the indoor facility within the structure.

11. The method of claim 1, wherein the structure is a multi-floor building, the method further comprising:
    receiving, from a map server, indoor facility data that specifies indoor facility information for the multi-floor building on a per-floor basis.

12. The method of claim 1, displaying the one or more indicators over or proximately to the representation of the structure includes:
    identifying a relatively empty portion proximate to the representation of the structure of the second digital, and
    displaying the one or more indicators at the identified empty portion.

13. A non-transitory computer-readable medium storing thereon instructions that, when executed on one or more processors of a computing device, cause the one or more processors to:
 display a first digital map of a geographic area via a user interface of the computing device at a first zoom level, wherein the digital map includes a representation of a structure;
 display a second digital map of the geographic area via the user interface at a second zoom level, wherein the second digital map includes a second representation of the structure;
 receive indoor facility information for a plurality of indoor facilities available at the structure, wherein the indoor facility data specifies, for each of the plurality of indoor facilities, (i) an indoor facility type, and (ii) a physical location of the indoor facility within the structure; and
 display respective indicators for the plurality of indoor facilities, including:
  at the first zoom level, display the indicators on the first digital map at places corresponding to the physical locations of the indoor facilities within the structure, and
  at the second zoom level, display all the indicators at a common point on the second digital map at or near the representation of the structure,
 wherein the second zoom level corresponds to a lower value than the first zoom level, and wherein the indicators have a same appearance on the first digital map and on the second digital map.

14. The computer-readable medium of claim 13, wherein the instructions cause the one or more processors to display the indicators at an entrance to the structure at the second zoom level.

15. The computer-readable medium of claim 13, wherein the instructions cause the one or more processors to display the indicators in response to determining that a user is hovering over the representation of the structure, at the second zoom level.

16. The computer-readable medium of claim 13, wherein each of the indicators includes an icon representative of the indoor facility type.

17. A computing device comprising:
 one or more processors;
 a user interface configured to receive user input and display output; and
 a computer-readable medium storing thereon instructions that, when executed on the one or more processors, cause the computing device to:
  receive, via the user interface, a request to display a first digital map of a geographic area at a first zoom level,
  display the first digital map via the user interface at the first zoom level, wherein the first digital map includes a first representation of a structure located in the geographic area
  at the first zoom level, display respective indicators for a plurality of indoor facilities available at the structure at places on the first digital map corresponding to physical locations of the indoor facilities within the structure,
  receive, via the user interface, a request to display a second digital map of the geographic area at a second zoom level,
  display the second digital map via the user interface at the second zoom level, wherein the first second map includes a second representation of the structure, and
  at the second zoom level, display all the indicators at a common point on the second digital map at or near the representation of the structure, and wherein the indicators have a same appearance on the first digital map and on the second digital map.

18. The computing device of claim 17, wherein the common point on the digital map at which all the indicators are displayed is near an entrance to the structure.

19. The computing device of claim 17, wherein the indicators include icons, each representative of a type of the corresponding indoor facility.

20. The computing device of claim 17, wherein the instructions cause the computing device to display the indicators at the common point in response to determining that a user is hovering over the representation of the structure.

* * * * *